United States Patent
Delaporte et al.

(10) Patent No.: US 12,467,373 B2
(45) Date of Patent: Nov. 11, 2025

(54) FOIL, ASSEMBLY FOR A TURBOMACHINE ROTOR AND TURBOMACHINE

(71) Applicant: SAFRAN AIRCRAFT ENGINES, Paris (FR)

(72) Inventors: Nicolas Daniel Delaporte, Moissy-Cramayel (FR); Pierre Marie Mulheim, Moissy-Cramayel (FR); Arnaud Martine, Moissy-Cramayel (FR); Antoine Giguet, Moissy-Cramayel (FR); Vincent Goyon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/688,009

(22) PCT Filed: Aug. 16, 2022

(86) PCT No.: PCT/FR2022/051584
§ 371 (c)(1),
(2) Date: Feb. 29, 2024

(87) PCT Pub. No.: WO2023/031533
PCT Pub. Date: Mar. 9, 2023

(65) Prior Publication Data
US 2024/0360769 A1 Oct. 31, 2024

(30) Foreign Application Priority Data
Sep. 1, 2021 (FR) .................................... 2109137

(51) Int. Cl.
*F01D 5/30* (2006.01)

(52) U.S. Cl.
CPC .......... *F01D 5/3007* (2013.01); *F01D 5/3023* (2013.01); *F05D 2220/323* (2013.01); *F05D 2240/20* (2013.01); *F05D 2240/30* (2013.01)

(58) Field of Classification Search
CPC .............................. F01D 5/3007; F01D 5/3092
See application file for complete search history.

(56) References Cited

U.S. PATENT DOCUMENTS

| | | | |
|---|---|---|---|
| 2,928,651 A | 3/1960 | Turnbull | |
| 11,905,852 B2 * | 2/2024 | Pernleitner | ........... F01D 5/3007 |
| 2002/0182081 A1 * | 12/2002 | Bachofner | ................ F01D 5/32 |
| | | | 416/220 R |

FOREIGN PATENT DOCUMENTS

| | | | |
|---|---|---|---|
| FR | 3075255 B1 * | 6/2020 | ............ F01D 11/006 |
| FR | 3 107 922 A1 | 9/2021 | |

OTHER PUBLICATIONS

International Search Report as issued in International Patent Application No. PCT/FR2022/051584, dated Sep. 29, 2022.

* cited by examiner

Primary Examiner — Courtney D Heinle
Assistant Examiner — John S Hunter, Jr.
(74) Attorney, Agent, or Firm — Pillsbury Winthrop Shaw Pittman LLP

(57) ABSTRACT

A foil for a turbomachine rotor blade, configured to be mounted on a root of the rotor blade and including an embossment located in a lower surface of the foil and forming, in the lower surface of the foil, a convex protrusion capable of being inserted into a housing formed in a lower face of the blade root.

10 Claims, 3 Drawing Sheets

FOIL, ASSEMBLY FOR A TURBOMACHINE ROTOR AND TURBOMACHINE

CROSS-REFERENCE TO RELATED APPLICATIONS

This application is the U.S. National Stage of PCT/FR2022/051584, filed Aug. 16, 2022, which in turn claims priority to French patent application number 2109137 filed Sep. 1, 2021. The content of these applications are incorporated herein by reference in their entireties.

TECHNICAL FIELD OF THE INVENTION

The present invention relates to a foil for a turbomachine rotor blade. It also relates to a rotor assembly including such a foil mounted to a blade root and to a turbomachine equipped with at least one such assembly.

The invention finds applications in the field of aeronautics and, in particular, in the field of turbomachine rotors to increase the life time of said rotors.

TECHNOLOGICAL BACKGROUND OF THE INVENTION

It is known in aeronautics that a rotor blade 10, one example of which is represented in FIG. 1, comprises a vane 12 provided, in its lower part, with a platform 11 radially extending to a root 20 to be inserted into a cavity arranged in the outer periphery of a rotor disc. The root 20 of the rotor blade 10—also referred to as the moving blade—is held radially in the cavity of the disc by shape cooperation between said root, which is generally dovetail-shaped, and the cavity, which is generally cell-shaped. At the upper part, the i_12 is provided with a heel 13 intended to be arranged side by side with the heel of the adjacent moving blades so as to form a rotating circumferential ring delimiting a surface of revolution about the axis of rotation XX of the disc.

During operation of the rotor, contact between the blade roots, generally made of titanium aluminide, and the disc, generally made of nickel-based alloy, leads to premature wear of the blade roots. And significant wear of the blade roots can cause the heels of the moving blades to overlap or even dislocate from one another, resulting in a loss of contact between the heels. Such wear can also lead to the formation of a crack, which can then cause the blade root to break, potentially releasing the blade into a turbomachine stream.

In order to limit wear on the blade roots and the disc cells, it is known to place a contact piece, called a foil (or tinsel) and referenced 30, at the contact interfaces, commonly referred to as seats, between the blade roots and the disc cavities. The foil 30, which is integral with the blade root 20 and in contact with the disc, takes up most of the energy dissipated by friction in the contact between said blade root and the disc, thereby limiting wear on the blade root.

FIG. 2 represents, in an enlarged view, the root 20 of the moving blade 10 of FIG. 1, around which a conventional foil 30 is mounted. An example of this conventional foil 30 is represented in a perspective view in FIG. 3.

As can be seen in FIGS. 2 and 3, the foil 30 includes an overall U-shaped cross-section formed by two side legs 32 intended to cover the side flanks 22 of the root 20 of the moving blade 10 and to hold the foil 30 on the root 20. The foil 30 also includes a base 31, also referred to as the lower surface of the foil, which connects the side legs 32 together and covers the lower face 21 of the root 20.

In order to prevent the foil 30 from disengaging from the root 20, the base 31 of the foil comprises radial tabs 33, 34 bearing against the upstream 23 and downstream 24 faces of the root 20 of the blade. The radial tabs 33, 34 are lamellae cut out at the end of the base 31 and radially folded back along the upstream and downstream faces 23, 24 of the root 20. These radial tabs 33, 34 extend over a greater or lesser width, between the side legs 32 of the foil, and form stops which make it possible to block relative axial movements between the root 20 and the foil 30.

However, despite the presence of these radial tabs, turbomachine maintenance operators have noticed that the foils tend to move axially, which damages and even cuts away the radial tabs. Indeed, as a result of radially folding them during the manufacturing phase and/or unfolding them during the mounting phase, the radial tabs are embrittled and friction generated by the repeated axial displacement of the foils has the effect of cutting them out. Once the radial tabs are broken, the foils can become partially or even totally disengaged from the blade roots, requiring the rotor to be removed for repair. Removing and repairing the rotor bring about significant repair costs (parts and labour) and downtime for the turbomachine.

There is therefore a real need for a foil that is more robust and more resistant to friction.

SUMMARY OF THE INVENTION

In response to the above-discussed problems of robustness and friction resistance of foils, the applicant provides a foil for a moving blade, the lower surface of which is equipped with a boss configured to be inserted into a housing of the lower face of the blade root.

According to a first aspect, the invention relates to a foil for a moving blade of a turbomachine, configured to be mounted to a root of said moving blade and comprising blocking means for preventing at least some of the relative movements between the blade root and said foil. This foil is characterised in that the blocking means include a boss located in a lower surface of the foil and forming, in said lower surface of the foil, a convex protrusion capable of being inserted into a housing formed in a lower face of the blade root.

The boss of the foil according to the invention has the advantage of limiting or even preventing any relative displacement between the foil and the blade root. Because it is positioned under the blade root, it also has the advantage of being less loaded than other blocking means (radial tabs) during relative displacements between the blade root and the foil, which ensures it has a longer life time. The boss of the lower surface also has the advantage of not hindering operation of the blade because it is implemented on the lower face of the blade root, which is a non-functional face of the blade root.

The use of a foil according to the invention in a turbomachine makes it possible to limit number of engine removals, to reduce the number of pieces to be changed during an engine removal and, therefore, to reduce maintenance costs of the turbomachine. It also makes it possible to increase lifetime of turbomachines and improve flight safety.

In the present application, the terms "lower", "upper" and "outer" are interpreted with reference to the position of a piece or surface with respect to the axis of rotation of the turbomachine, a lower surface being closer to the axis of rotation than an external or outer surface. The term "lateral"

is interpreted as "which is located on the sides of a piece which radially extends" along an axis perpendicular to the axis of rotation XX. The term "axial" is to be interpreted as "along the direction of the axis of rotation" and the term "radial" as "along a direction perpendicular to the axis of rotation" or "along the direction of a radius of the blade ring". The terms "upstream" and "downstream" will be interpreted with reference to the flow direction of the air stream in the turbomachine.

In addition to the characteristics just discussed in the preceding paragraph, the foil according to one aspect of the invention may have one or several additional characteristics from among the following, considered individually or according to any technically possible combinations:

The boss of the lower surface of the foil is similar in shape to the housing formed in the lower face of the blade root.

The boss is positioned in a substantially central zone of the lower surface of the foil.

The boss is in the form of a hemispherical, semi-ellipsoidal or semi-ovoidal dome.

The boss of the lower surface of the foil is made by embossing.

A second aspect of the invention relates to an assembly for a turbomachine rotor, including a moving blade configured to be rotatably movable about an axis of rotation and comprising a vane radially extending between a blade heel and a blade root, said blade root including a lower face extending in a plane parallel to the axis of rotation. The assembly is characterised in that it includes a foil as defined above and at least partially mounted around the blade root, the lower face of the blade root including a recess forming a housing for the boss of the lower surface of the foil.

It will be understood that a plane parallel to the axis of rotation XX is a plane which extends perpendicularly to a radius of the circumferential ring formed by adjacent moving blades.

According to some embodiments, the blade root is configured to be mounted in a cavity of a disc of the turbomachine and the assembly is characterised in that a height between the lower surface of the foil and a central point of the boss is greater than a clearance between the lower face of the blade root and a bottom of the cavity of the disc.

According to some embodiments, the recess formed in the lower face of the blade root is similar in shape to the boss of the lower surface of the foil.

A third aspect of the invention relates to a turbomachine, characterised in that it includes at least one rotor assembly as defined above.

BRIEF DESCRIPTION OF THE FIGURES

Further advantages and characteristics of the invention will become apparent from the following description, illustrated by the figures in which.

DETAILED DESCRIPTION

An exemplary embodiment of a foil for a moving blade, configured to be more robust and more resistant to friction than conventional foils, is described in detail below, with reference to the appended drawings. This example illustrates characteristics and advantages of the invention. It is however reminded that the invention is not limited to this example.

In the figures, identical elements are marked by identical references. For reasons of legibility of the figures, the size scales between the elements represented are not respected.

Figure 1:
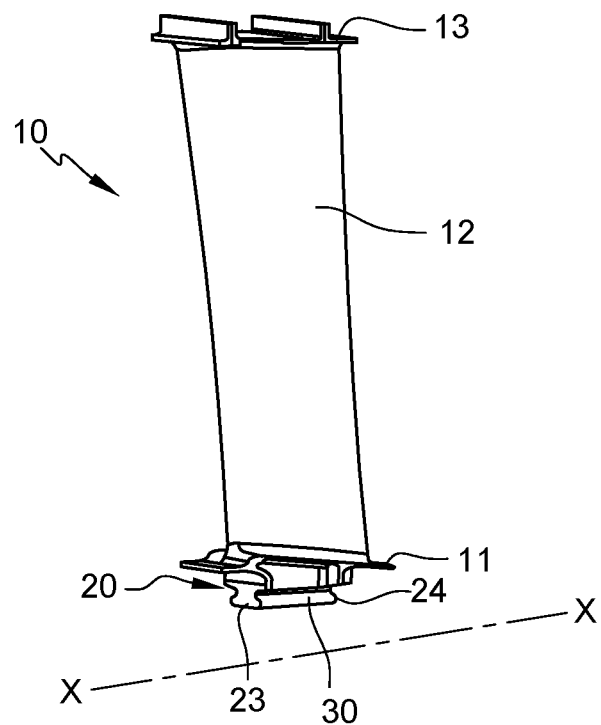
FIG. 1, already described, represents a schematic perspective view of a turbomachine moving blade according to the state of the art.
Figure 2:
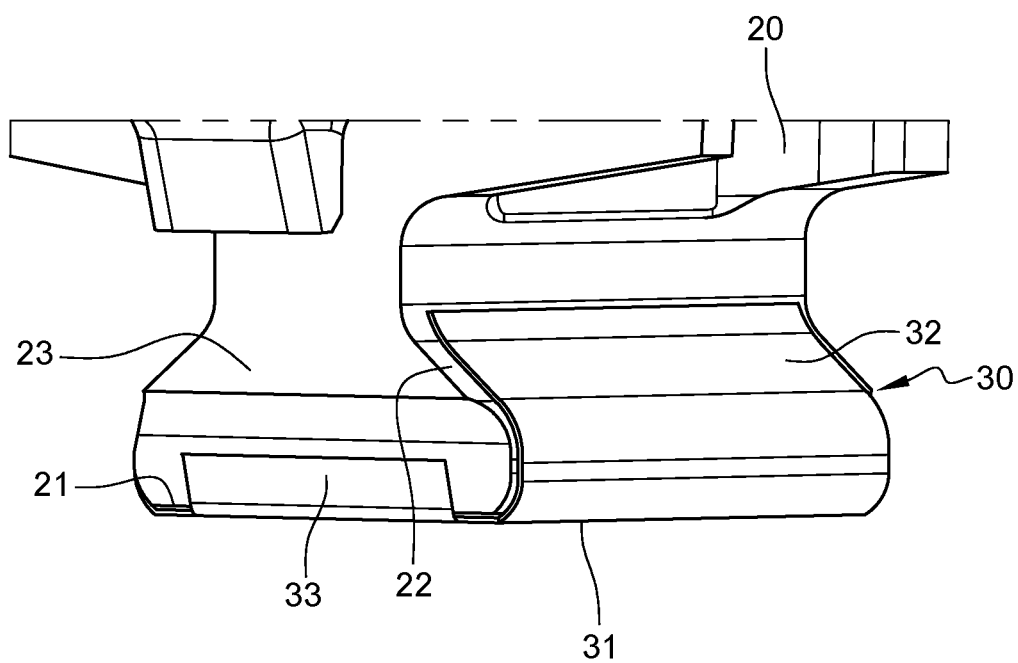
FIG. 2, already described, represents a schematic perspective view of a moving blade root equipped with a foil according to the state of the art.
Figure 3:
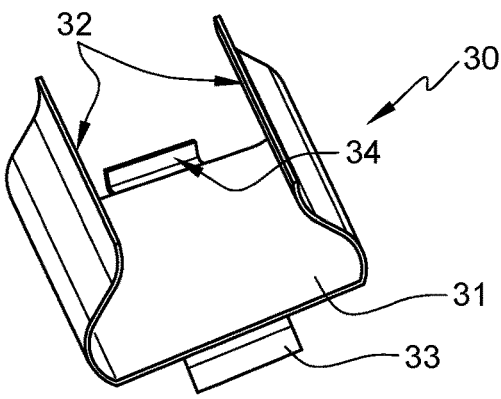
FIG. 3, already described, schematically represents a perspective view of a foil according to the state of the art.
Figure 4:
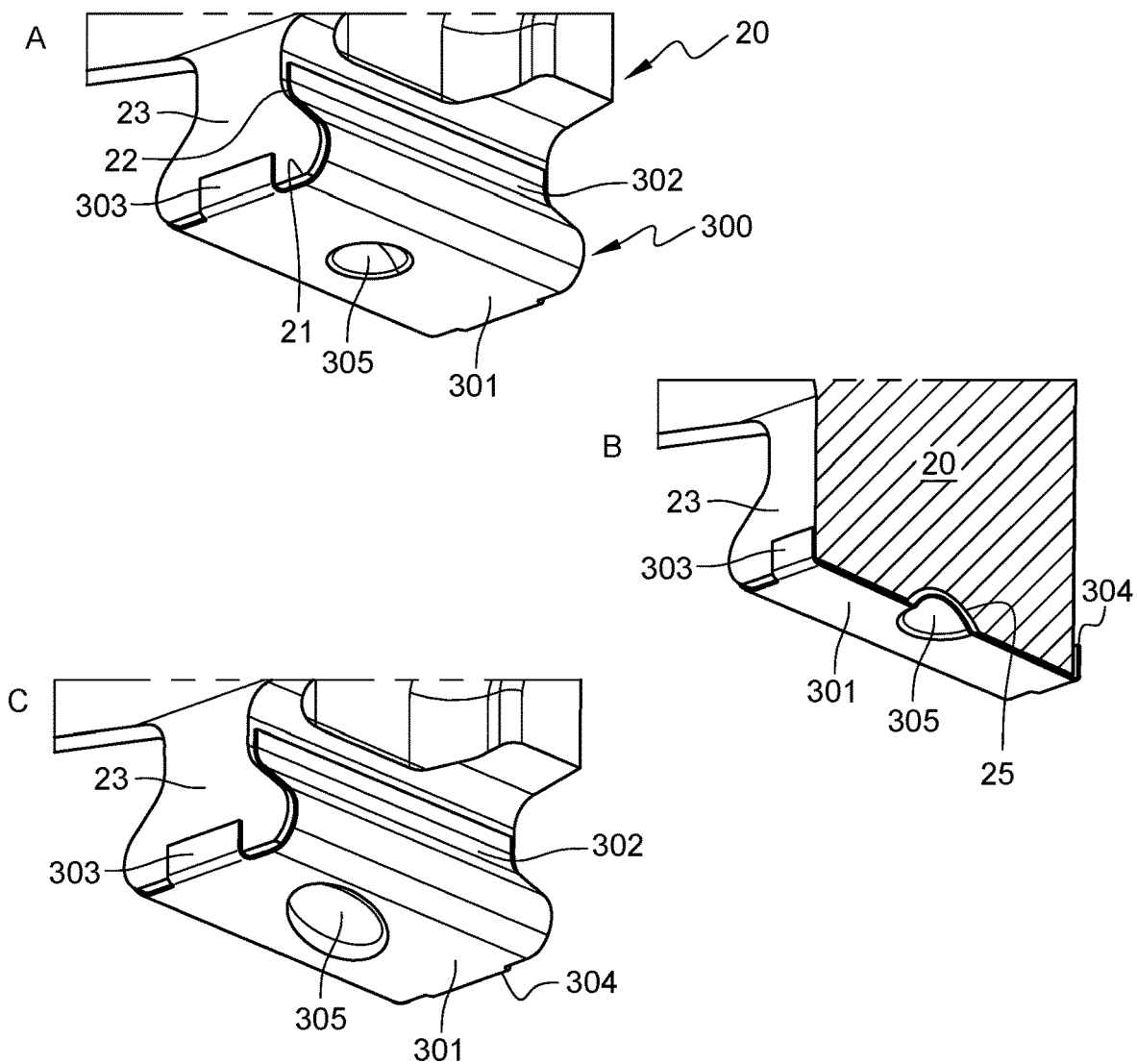
FIG. 4 represents schematic perspective views (A, C) and a schematic cross-sectional view (B) of two embodiments of a foil according to the invention mounted to a moving blade root.
Figure 5:
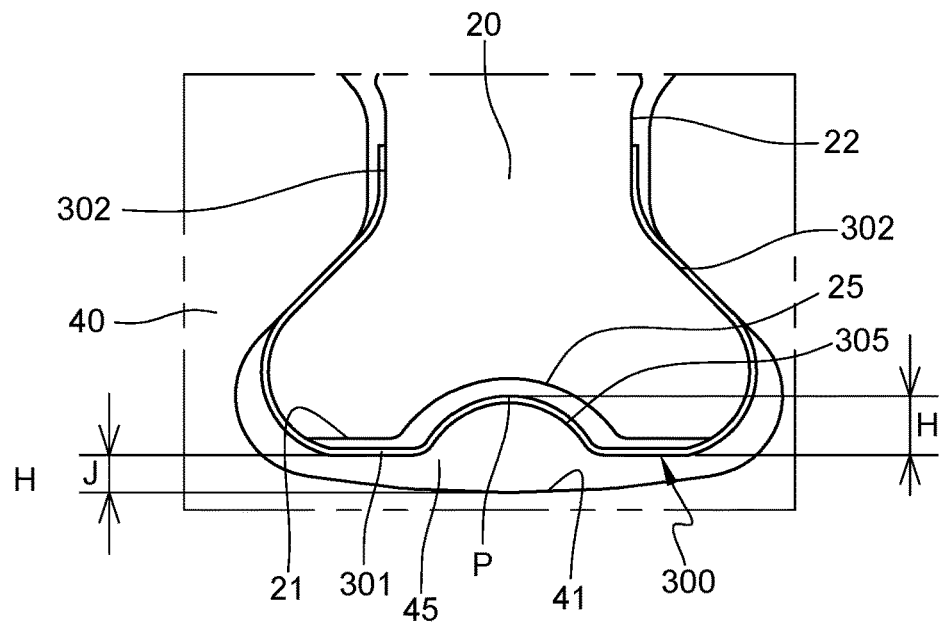
FIG. 5 represents a schematic front cross-sectional view of a blade root equipped with a foil according to the invention, mounted in a disc cavity.

An example of a foil according to the invention, mounted around a moving blade root, is represented in a side view in part A of FIG. 4 and in a cross-sectional profile view in part B of FIG. 4. This foil, referenced 300, is represented in FIG. 5, in a front cross-sectional view, mounted around a blade root housed within a cavity of a rotor disc. The same foil mounted around a blade root is also represented in a side cross-sectional view in FIG. 6.

This foil 300 is designed to be mounted around a blade root 20, in particular at the contact interfaces between said blade root 20 and a cavity 45 of a rotor disc, this cavity 45 being adapted to receive said blade root. Indeed, as a reminder, each root 20 of the moving blade 10 is engaged in a cavity 45 arranged in the outer periphery of the disc 40 and radially held in said cavity by shape cooperation between the root 20 and the cavity 45. Generally, the blade root 20 is dovetail-shaped and the cavity 45 of the disc is cell-shaped. The root 20 of the moving blade 10 comprises a lower face 21, facing the bottom 41 of the cavity 45, an upstream face 23, a downstream face 24 and two side flanks 22 forming the contact interfaces of the blade root with the cavity 45.

Upon rotating the rotor disc 40, the moving blades 10 are subjected to centrifugal forces and, under the effect of these centrifugal forces, the side flanks 22 of the blade roots 20 abut against the contact interfaces of the disc cavities 45. A foil 300 is positioned around each root 20 of the moving blade, between the contact interface of the blade root and the contact interface of the corresponding cavity of the disc, so as to limit wear to said blade roots.

Like most foils, the foil 300 according to the invention includes an overall U-shaped cross-section formed by two side legs 302 connected through a lower surface 301. The lower surface 301 of the foil, or base of the foil, covers the lower face 21 of the blade root 20. The lateral legs 302 each cover at least one part of the two lateral sides 22 of the blade root 20.

According to the embodiments represented in the figures, the foil 300 comprises radial tabs 303, 304, produced by cutting the lower surface 301 and radially folding along the upstream 23 and downstream 24 faces of the blade root 20. These radial tabs constitute a first blocking means limiting relative movements between the blade root and the foil.

Each of the radial tabs 303, 304 is cut out at one of the free ends of the lower surface 301, i.e. on one of the sides of the lower surface 301 extending between the two side legs 302 of the foil, with a predefined, for example rectangular or square, shape with reduced dimensions in comparison with the dimensions of the upstream and downstream faces of the blade root. Upon manufacturing the foil 300, or upon mounting said foil to the blade root 20, each radial tab 303, 304 is folded and radially folded back along, respectively, the upstream face 23 and the downstream face 24 of the blade root so as to form, with the lower surface 301, a substantially right angle. These radial tabs 303, 304 thus form axial stops for limiting relative axial movements between the root 20 and the foil 300.

In addition to the radial tabs 303, 304, the foil 300 according to the invention includes complementary blocking means for increasing limitation of relative movements between the blade root 20 and the foil 300. These complementary blocking means include a boss 305 located in the lower surface 301 of the foil.

In some embodiments, not represented in the figures, the boss 305 may be the sole blocking means for limiting relative movements between the blade root and the foil. In this case, the foil 300 does not include any radial tabs, and the boss 305 is sufficiently strong to compensate for the absence of said radial tabs.

The boss 305 is a convex protrusion projecting from the lower surface 301 of the foil 300. This protrusion, which extends inside the blade root 20 towards the vane 12, can be produced by embossing, stamping, punching, die-cutting or any other known metal shaping technique.

The boss 305 may be located at any place on the lower surface 301 of the foil. It may be located in the central zone of the lower surface 301, so as to form a central stop which, for reasons of symmetry, makes it possible to simplify manufacture thereof, manufacture of the vane and mounting of the foil to the blade root.

In some embodiments, several bosses 305 may be distributed over the lower surface 301 of the foil to further improve blocking of the foil. Only boss 305 will be described below, it being understood that several bosses, identical or not, can be made on the lower surface 301 of the foil.

The boss 305 may be of different shapes. It may, for example, have the shape of a hemispherical dome or a half-sphere, i.e. a shape whose cross-section is substantially circular. Alternatively, it may have a semi-ellipsoidal or semi-ovoidal shape, i.e. a shape whose cross-section is substantially oval. Although other boss shapes are contemplatable, these examples of dome shapes (hemispherical, semi-ellipsoidal, semi-ovoidal) offer the advantage that the foil 300, when mounted, can be slid under the blade root 20 until the boss 305 is snugly fitted into a recess 25 forming a housing in said blade root.

Figure 6:
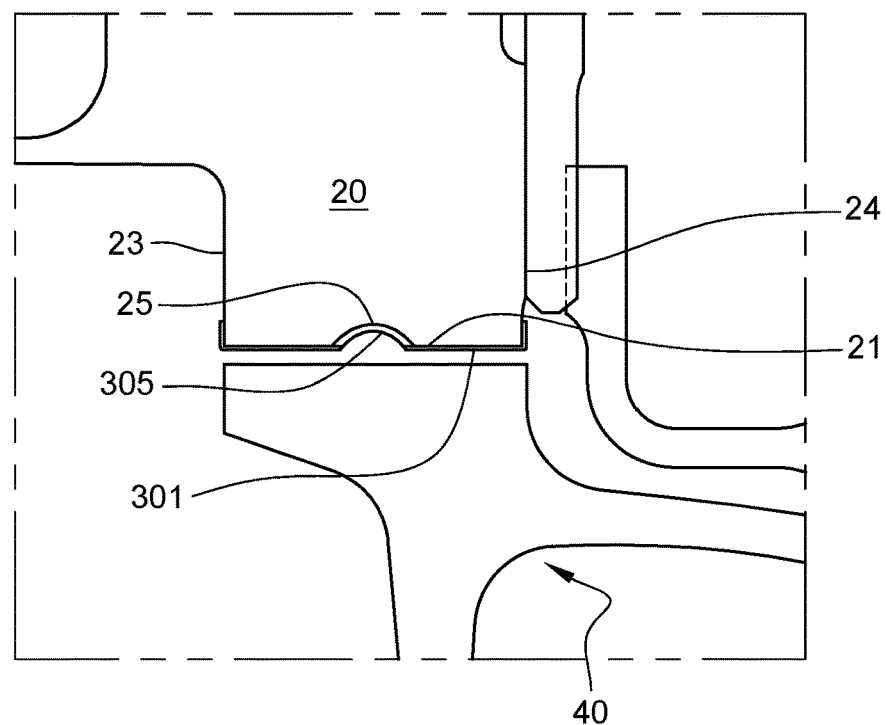
FIG. 6 represents a schematic cross-sectional side view of a blade root equipped with a foil according to the invention.

Indeed, as shown in FIGS. 4, 5 and 6, each blade root 20 of the rotor includes a recess 25 forming a housing for the boss 305. This housing 25 is a non-through hole formed in the lower face 21 of the blade root 20 and whose shape and dimensions are adapted to receive the boss 305 when the foil is mounted to the blade root. Stated differently, the recess 25 has dimensions at least equal to the dimensions of the boss 305. Preferably, to ensure an optimum stop effect, the shape and dimensions of the recess 25 are substantially similar to those of the boss 305. The recess 25 thus wraps the boss 305 with a minimum of clearance, which prevents any relative displacement between the blade root and the foil. In examples A and B of FIG. 4, both boss 305 and recess 25 have similar interlocking half-sphere shapes. In example C of FIG. 4, the boss 305 and recess 25 have similar semi-ellipsoidal dome shapes with the longer diameter extending in the upstream to downstream direction. When the boss 305 has a semi-ellipsoidal dome shape, different directions of extension of the boss can be contemplated.

According to some embodiments, and in order to ensure completely stable positioning of the foil 300, the distance or height H between the lower surface 301 of the foil and a central point P of the boss 305 is greater than a clearance J between the lower surface 301 of the foil and the bottom 41 of the cavity 45 of the disc, as shown in FIG. 5. The central point P of the boss 305 is the point on the boss 305 furthest from the bottom surface 301 of the foil. This inequality between height H and clearance J ensures that the foil 300 is held in position.

In some embodiments, the boss 305 is shaped prior to insertion into the recess 25 of the blade root. In particular, the boss 305 may be obtained by an embossing operation carried out prior to mounting the foil 300 to the blade root 20. Upon mounting, the foil 300 is slid under the blade root until the boss 305 snugly fits into the recess 25 in the blade root. Indeed, the foil 300 has a some flexibility due in particular to the choice of material (for example titanium aluminide) and also to its small thickness (for example in the order of 0.08 mm, 0.16 mm, or any other reduced thickness compared with the general dimensions of a foil). This flexibility means that the foil 300 can be shaped around the blade root by slight deformation. Once the blade root and its foil are inserted into the cavity 45 of the disc 40, the contact interfaces of the blade root, or bearing faces, press the foil 300 against the contact interfaces of the cavity, or external faces of the cavity; the boss 305 is then trapped in the recess 25 of the blade root, so that it cannot disengage from said recess and the foil is made stationary around the blade root and cannot move away therefrom.

Although described in a number of examples, alternatives and embodiments, the foil for a moving blade according to the invention comprises various alternatives, modifications and improvements which will be obvious to the person skilled in the art, it being understood that these alternatives, modifications and improvements are part of the scope of the invention.

The invention claimed is:

1. A foil for a moving blade of a turbomachine, the foil being configured to be mounted to a root of said moving blade and comprising blocking means for preventing at least some of the relative movements between the blade root and said foil, said foil having an overall U-shaped cross-section formed by a lower surface covering a lower face of the blade root and two side legs connected through the lower surface and covering each one at least one part of lateral sides of the blade root,
   wherein the blocking means include a boss located in the lower surface of the foil and forming, in said lower surface of the foil, a convex protrusion capable of being inserted into a housing formed in the lower face of the blade root, said convex protrusion having an outer periphery that is entirely connected to the lower surface of the foil.

2. The foil according to claim 1, wherein the boss of the lower surface of the foil is of a shape similar to that of the housing formed in the lower face of the blade root.

3. The foil according to claim 1, wherein the boss is positioned in a substantially central zone of the lower surface of the foil.

4. The foil according to claim 1, wherein the boss is in the form of a hemispherical, semi-ellipsoidal or semi-ovoidal dome.

5. The foil according to claim 1, wherein the boss of the lower surface of the foil is made by embossing or stamping.

6. An assembly for a turbomachine rotor, including a moving blade configured to be rotatably movable about an axis of rotation and including a vane radially extending between a heel and a blade root, said blade root comprising a lower face extending in a plane parallel to the axis of rotation,
- wherein the assembly includes a foil according to claim 1, mounted at least partially around the blade root, the lower face of the blade root including a recess forming a housing for the boss of the lower surface of the foil.

7. The assembly according to claim 6, wherein the blade root is configured so as to be mounted in a cavity of a disc of the turbomachine, wherein a height between the lower surface of the foil and a central point of the boss is greater than a clearance between the lower face of the blade root and a bottom of the cavity of the disc.

8. The assembly according to claim 6, wherein the recess formed in the lower face of the blade root is of a shape similar to that of the boss of the lower surface of the foil.

9. A turbomachine including a rotor comprising at least one assembly according to claim 6.

10. A set of a blade root and a foil for a moving blade of a turbomachine, the foil being mounted to the blade root and comprising blocking means for preventing at least some of the relative movements between the blade root and said foil, said foil having an overall U-shaped cross-section formed by a lower surface covering a lower face of the blade root and two side legs connected through the lower surface and covering each one at least one part of lateral sides of the blade root,
- wherein the blocking means include a boss located in the lower surface of the foil and forming, in said lower surface of the foil, a convex protrusion capable of being inserted into a housing formed in the lower face of the blade root, said convex protrusion having an outer periphery that is entirely connected to the lower surface of the foil.

* * * * *